(12) United States Patent
Lo et al.

(10) Patent No.: US 10,082,696 B2
(45) Date of Patent: Sep. 25, 2018

(54) LIQUID CRYSTAL PANEL AND LIQUID CRYSTAL DISPLAY DEVICE

(71) Applicant: Shenzhen China Star Optoelectronics Technology Co., Ltd., Shenzhen, Guangdong (CN)

(72) Inventors: Shin-Hsun Lo, Guangdong (CN); Jinbo Guo, Guangdong (CN); Jinjie Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 152 days.

(21) Appl. No.: 14/908,114

(22) PCT Filed: Aug. 26, 2015

(86) PCT No.: PCT/CN2015/088141
§ 371 (c)(1),
(2) Date: Jan. 27, 2016

(87) PCT Pub. No.: WO2017/020374
PCT Pub. Date: Feb. 9, 2017

(65) Prior Publication Data
US 2017/0219873 A1 Aug. 3, 2017

(30) Foreign Application Priority Data
Aug. 5, 2015 (CN) .......................... 2015 1 0473596

(51) Int. Cl.
*G02F 1/1335* (2006.01)
*G02F 1/1368* (2006.01)
(Continued)

(52) U.S. Cl.
CPC ...... *G02F 1/133514* (2013.01); *G02F 1/1337* (2013.01); *G02F 1/1339* (2013.01); *G02F 1/1368* (2013.01); *G02F 2201/52* (2013.01)

(58) Field of Classification Search
CPC ............. G02F 1/133514; G02F 1/1368; G02F 1/1339; G02F 1/1337; G02F 2201/52
(Continued)

(56) References Cited

U.S. PATENT DOCUMENTS

2007/0029550 A1* 2/2007 Yoshida ................ G02F 1/1393
257/59
2010/0134730 A1 6/2010 Wu et al.
2015/0168771 A1 6/2015 Kim et al.

FOREIGN PATENT DOCUMENTS

CN 101256317 A 9/2008
CN 101344696 A 1/2009
(Continued)

*Primary Examiner* — Charles Chang
(74) *Attorney, Agent, or Firm* — Andrew C. Cheng

(57) ABSTRACT

The present disclosure discloses a liquid crystal panel, including an array substrate and a color filter substrate formed oppositely to the array substrate and a LC layer sandwiched between the array substrate and the color filter substrate, and a seal formed around the LC layer. A wall is formed on a position of the array substrate next to the seal and toward the LC layer. Multiple color resister units are sequentially connected on a coplanar face to form the wall. The color resister A is formed by more than three color resisters sequentially arranged and the adjacent color resisters the two color resister units A are different. The present disclosure provides a liquid crystal display device.

10 Claims, 2 Drawing Sheets

(51) Int. Cl.
*G02F 1/1339* (2006.01)
*G02F 1/1337* (2006.01)

(58) Field of Classification Search
USPC .................................................. 349/106–109
See application file for complete search history.

(56) References Cited

FOREIGN PATENT DOCUMENTS

| | | | |
|---|---|---|---|
| CN | 101923255 | A | 12/2010 |
| CN | 104166270 | A | 11/2014 |
| CN | 104360531 | A | 2/2015 |
| JP | H1138424 | A | 2/1999 |
| JP | 2004170521 | A | 6/2004 |
| JP | 2008026566 | A | 2/2008 |
| TW | 201111882 | A | 4/2011 |

* cited by examiner

LIQUID CRYSTAL PANEL AND LIQUID CRYSTAL DISPLAY DEVICE

CROSS-REFERENCE TO RELATED APPLICATIONS

This application claims the priority of Chinese Patent Application No. 201510473596.1, entitled "liquid crystal panel and liquid crystal display device", filed on Aug. 5, 2015, the disclosure of which is incorporated herein by reference in its entirety.

FIELD OF THE INVENTION

The present disclosure relates to a display technology field, and more particularly to a light guide plate and a back light module.

BACKGROUND OF THE INVENTION

Currently, the liquid crystal display device is commonly used as the display element of each of various electronic equipment. The liquid crystal panel includes an array substrate, a color filter substrate formed oppositely to the array substrate, and multiple liquid crystals sandwiched between the array substrate and the color filter substrate. A seal is formed between the array substrate and the color filter substrate to seal the liquid crystals. Multiple supports are formed between the color filter substrate and the array substrate. Thus, a display area, an intermediate area around the display area are and the seal formed around the intermediate area are formed on the liquid crystal panel.

In general, a polyimide (PI) alignment film is coated on the color filter substrate (CF substrate) and the array substrate (TFT substrate) to have a function of controlling directions of the liquid crystal molecules. A PI wall is formed around the PI to avoid the PI overflowing. In the present non-COA (CF on Array)-manufactured product, the TFT substrate usually does not have the PI wall and the CF substrate uses photo spacers (PS) as the PI wall. However, in the COA product, RGB color resisters are formed on the TFT substrate, so an RGB (such as B) used as the PI wall of the TFT substrate are required.

SUMMARY OF THE INVENTION

The objective of the present disclosure is to provide a liquid crystal panel using color resisters of an array substrate as a wall.

The present disclosure also provides a liquid crystal display device.

The present disclosure provides the liquid crystal panel, comprising an array substrate, a color filter substrate formed oppositely to the array substrate, a liquid crystal layer sandwiched between the array substrate and the color filter substrate, and a seal formed around the LC layer. A wall is formed on a position of the array substrate and toward the LC layer, wherein the position is next to the seal. Multiple color resister units are sequentially connected on a coplanar face to form the wall. The color resister is formed by more than three color resisters sequentially arranged and the two adjacent color resisters of the two color resister units are different.

Selectively, the color resister of the color resister unit is rectangular or formed of "Z" shape.

Selectively, the color resister unit is formed by arranging the three color resisters comprising RGB, or the color resister unit is formed by arranging the four color resisters comprising WRGB.

Selectively, the color unit is mask-formed by a single photoresist layer which is sequentially and horizontally shifted.

Selectively, the array substrate comprises an alignment film adjacent to the LC layer and the wall is formed a side of the alignment film depart from the LC layer and next to the seal.

Selectively, a gap formed between the two color resisters with same colors of the two color resister unit is a sum of dimensions of the two color resisters.

The present disclosure provides the liquid crystal display device, comprising a liquid crystal panel and the liquid crystal panel comprising an array substrate and a color filter substrate formed oppositely to the array substrate, a liquid crystal layer sandwiched between the array substrate and the color filter substrate, and a seal formed around the LC layer, wherein a wall is formed on an edge of the array substrate, wherein the edge is toward the LC layer; multiple color resister units are sequentially connected on a coplanar face to form the wall; the color resister is formed by more than three color resisters sequentially arranged; and the two adjacent color resisters of the two color resister units are different.

Selectively, the color resister of the color resister unit is rectangular or formed of "Z" shape.

Selectively, the color resister unit is formed by arranging the three color resisters comprising RGB, or the color resister unit is formed by arranging the four color resisters comprising WRGB.

Selectively, a gap formed between the two color resisters with same colors of the two color resister unit is a sum of dimensions of the two color resisters.

The wall is formed by the color resisters on the array substrate of the liquid crystal panel of the present disclosure. The color resister units are sequentially connected on the coplanar face to form the wall. The color resister unit is formed by arranging the more than three color resisters, but not formed by overlapping R, G and B to avoid the wall with a larger thickness.

BRIEF DESCRIPTION OF THE DRAWINGS

In order to more clearly illustrate the embodiments of the present disclosure or prior art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF THE PREFERRED EMBODIMENTS

Embodiments of the present disclosure are described in detail with the technical matters, structural features, achieved objects, and effects with reference to the accompanying drawings as follows. It is clear that the described embodiments are part of embodiments of the present disclosure, but not all embodiments. Based on the embodiments of the present disclosure, all other embodiments to those of ordinary skill in the premise of no creative efforts obtained, should be considered within the scope of protection of the present disclosure.

Figure 1:
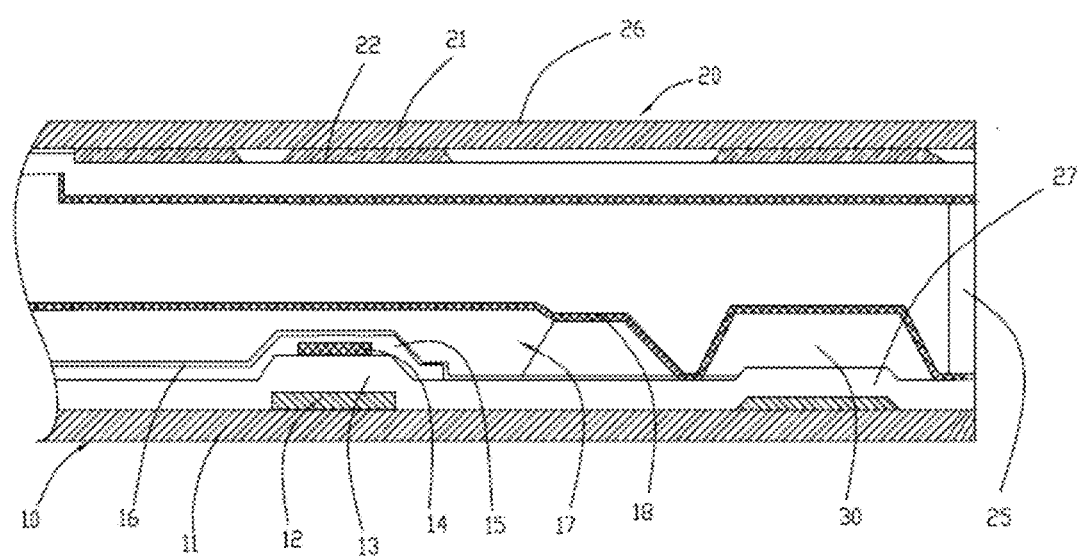
FIG. 1 is a side plan schematic view of a liquid crystal panel of the present disclosure.
Figure 2:
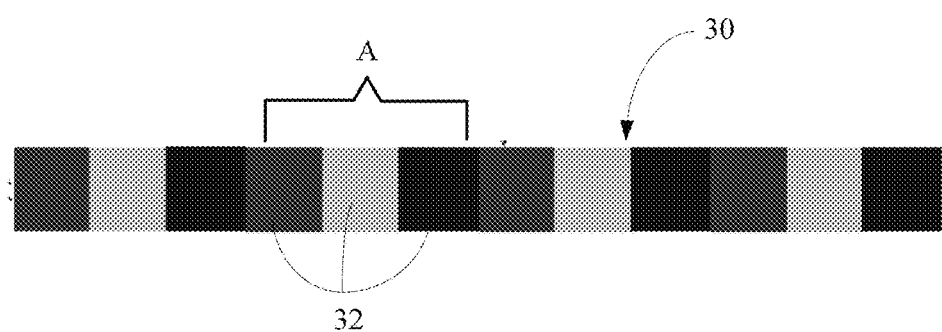
FIG. 2 is a partial top view of a wall of the liquid crystal panel of the present disclosure.

Please refer to FIG. 1 and FIG. 2, a preferred embodiment of the present disclosure provides a liquid crystal panel comprising an array substrate 10, a color filter substrate 20 formed oppositely to the array substrate 10, a LC layer (not shown in the drawing) sandwiched between the array substrate 10 and the color filter substrate 20, and a seal 25 formed around the LC layer and between the array substrate 10 and the color filter substrate 20. A wall 30 is formed on a position of the array substrate 10 and toward the LC layer, and the position is next to the seal 25. Multiple color resister units A are sequentially connected on a coplanar face to form the wall 30. The color resister A is formed by more than three color resisters 32 sequentially arranged and the two adjacent color resisters of the two color resister units A are different.

In the embodiment, the liquid crystal panel also comprises a display area 26. An intermediate area 27 is separated from the display area 26 of the liquid crystal panel and the seal 25. The wall 30 is in the intermediate area 27. In the present disclosure, using the array substrate and the color filter substrate on an edge area of the liquid crystal panel as an example to further describe. The wall 30 is on an edge of the liquid crystal panel.

In the present embodiment, the array substrate 10 comprises that a first glass substrate 11, a gate layer 12, a gate isolation layer 13, a semiconductor layer 14, a source-drain layer 15, an isolation 16, a pixel unit layer 17 and an alignment layer 18 are sequentially formed. The gate layer 12 is formed on the first glass substrate 11. The gate isolation layer 13 is formed to cover the gate layer 12 and the first glass substrate 11. The semiconductor layer 14 and the source-drain layer 15 are formed on the gate isolation layer 13 and the semiconductor layer 14 is orthography-projected to the gate layer 12. The alignment layer 18 is formed on an alignment film formed on the pixel unit layer 17 and the isolation layer 16 and adjacent to the LC layer. The wall 30 is formed a side of the alignment film 18 depart from the LC layer and next to the seal 25. The color filter substrate 20 comprises a second glass substrate 21 and an array layer 22 formed on the second glass substrate 21. The array layer 22 is toward to the LC layer.

Furthermore, the color resister unit A is formed by arranging the three color resisters including RGB, or the color resister unit A is formed by arranging the four color resisters including WRGB. The wall 30 is formed by the multiple color resister units A. in the present embodiment, the color resister unit A is formed by the three color resisters including RGB. Wherein, R, G and B respectively represents as red, green and blue colors. The wall 30 is formed of a shape of strip and formed around an edge of the LC layer of the liquid crystal panel.

Please refer to FIG. 2 again, in the present embodiment, the color resister 32 of the color resister A is rectangular. Particularly, the color resisters 32 are three colors or four colors. Each color resister is a rectangular area and has the same size. Wherein, a gap formed between the two color resisters 32 with same colors of the two color resister unit A is a sum of dimensions of the two color resisters. Thus, the gap formed between the two color resisters R of the two adjacent color resister units A is equal to the sum of dimensions of the color resister G and color resister B.

Figure 3:
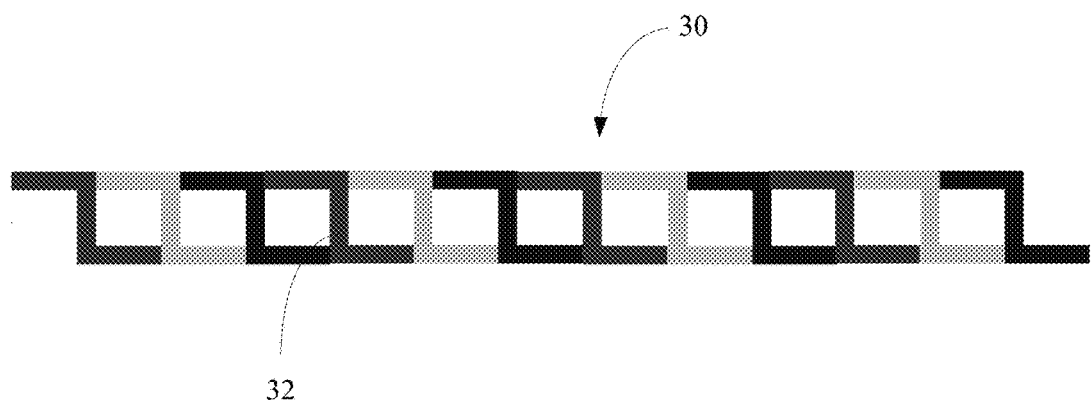
FIG. 3 is another schematic view of resisters of a wall of the liquid crystal panel of the present disclosure.

Please refer to FIG. 3, in another embodiment, the color resister 32 is formed of a "Z" shape. The "Z"-shaped color resisters 32 are sequentially and firstly connected to form the wall.

Furthermore, the color resister unit A is mask-formed by a single photoresist layer which is sequentially and horizontally shifted. Particularly, when the array substrate is fabricated, the photoresist layer is provided. At a first mask stage, the R color resisters of the wall 30 are formed. A gap between the two R color resisters is the sum of the dimensions of the two color resisters. And then, the photoresist layer is horizontally shifted to proceed a second mask stage to form G color resisters next to R color resisters. The photoresist layer is further horizontally shifted to proceed a third mask stage to form B color resisters. Wherein, the wall 30 is formed of the shape of strip horizontally arranged by the three color resisters. In this process, only one photoresist layer is used to form the three color resisters so a fabricating cost is decreased.

The present disclosure also provides a liquid crystal display device having the foregoing liquid crystal panel.

The wall is formed by the color resisters on the array substrate of the liquid crystal panel of the present disclosure. The color resister units A are sequentially connected on the coplanar face to form the wall 30. The color resister unit A is formed by arranging the more than three color resisters, but not formed by overlapping R, G and B. The color strip of the wall is presented to avoid the wall with a larger thickness.

The above embodiments of the present disclosure are not used to limit the claims of this disclosure. Any use of the content in the specification or in the drawings of the present disclosure which produces equivalent structures or equivalent processes, or directly or indirectly used in other related technical fields is still covered by the claims in the present disclosure.

What is claimed is:

1. A liquid crystal panel, comprising an array substrate, a color filter substrate formed oppositely to the array substrate, a liquid crystal layer sandwiched between the array substrate and the color filter substrate, and a seal formed around the liquid crystal layer, wherein the array substrate has a pixel unit layer and a wall is only formed on an edge of the array substrate, between the pixel unit layer and the seal, and toward the liquid crystal layer, wherein multiple color resister units are sequentially connected on a coplanar face to form the wall, so the color resisters of the wall are only formed on the edge of the array substrate but not formed on or in the pixel unit layer; the color resister unit is formed by more than three color resisters sequentially arranged; and the two adjacent color resisters of the two color resister units are different.

2. The liquid crystal panel according to claim 1, wherein the color resister of the color resister unit is rectangular or formed of "Z" shape.

3. The liquid crystal panel according to claim 2, wherein the color resister unit is formed by arranging the three color resisters comprising RGB, or the color resister unit is formed by arranging the four color resisters comprising WRGB.

4. The liquid crystal panel according to claim 3, wherein the color unit is mask-formed by a single photoresist layer which is sequentially and horizontally shifted.

5. The liquid crystal panel according to claim 4, wherein a gap formed between the two color resisters with same colors of the two color resister unit is a sum of dimensions of the two color resisters.

6. The liquid crystal panel according to claim 1, wherein the array substrate comprises an alignment film adjacent to the liquid crystal layer and the wall is formed a side of the alignment film depart from the liquid crystal layer and next to the seal.

7. A liquid crystal display device, comprising a liquid crystal panel and the liquid crystal panel comprising an array substrate and a color filter substrate formed oppositely to the array substrate, a liquid crystal layer sandwiched between the array substrate and the color filter substrate, and a seal formed around the liquid crystal layer, wherein the array substrate has a pixel unit layer and a wall is only formed on an edge of the array substrate, between the pixel unit layer and the seal, toward the liquid crystal layer; wherein multiple color resister units are sequentially connected on a coplanar face to form the wall, so the color resisters of the wall are only formed on the edge of the array substrate but not formed on or in the pixel unit layer; the color resister unit is formed by more than three color resisters sequentially arranged; and the two adjacent color resisters of the two color resister units are different.

8. The liquid crystal display device according to claim 7, wherein the color resister of the color resister unit is rectangular or formed of "Z" shape.

9. The liquid crystal display device according to claim 8, wherein the color resister unit is formed by arranging the three color resisters comprising RGB, or the color resister unit is formed by arranging the four color resisters comprising WRGB.

10. The liquid crystal display device according to claim 7, wherein a gap formed between the two color resisters with same colors of the two color resister unit is a sum of dimensions of the two color resisters.

* * * * *